(12) United States Patent
De Vos et al.

(10) Patent No.: US 12,362,543 B2
(45) Date of Patent: Jul. 15, 2025

(54) METHODS AND SYSTEMS FOR AUTOMATICALLY CONFIGURING ELECTRICAL DEVICES IN AN ELECTRICAL PANEL

(71) Applicant: Schneider Electric Industries SAS, Rueil-Malmaison (FR)

(72) Inventors: Gilles De Vos, Brie et Angonnes (FR); Alan Freeman, Raleigh, NC (US)

(73) Assignee: Schneider Electric Industries SAS, Rueil-Malmaison (FR)

( * ) Notice: Subject to any disclaimer, the term of this patent is extended or adjusted under 35 U.S.C. 154(b) by 0 days.

(21) Appl. No.: 18/010,950

(22) PCT Filed: Aug. 11, 2022

(86) PCT No.: PCT/EP2022/072507
§ 371 (c)(1),
(2) Date: Dec. 16, 2022

(87) PCT Pub. No.: WO2023/017108
PCT Pub. Date: Feb. 16, 2023

(65) Prior Publication Data
US 2024/0235169 A1 Jul. 11, 2024

(30) Foreign Application Priority Data

Aug. 12, 2021 (FR) ...................................... 2108666

(51) Int. Cl.
*H02B 1/36* (2006.01)
*G05B 19/042* (2006.01)
(Continued)

(52) U.S. Cl.
CPC ........... *H02B 1/36* (2013.01); *G05B 19/0423* (2013.01); *G05B 19/048* (2013.01); *H02B 1/306* (2013.01); *H02B 1/48* (2013.01)

(58) Field of Classification Search
CPC . H02B 1/36; H02B 1/306; H02B 1/48; H02B 3/00; G05B 19/0423; G05B 19/048
See application file for complete search history.

(56) References Cited

U.S. PATENT DOCUMENTS 7,118,026 B2 * 10/2006 Harris ................. G07G 1/0054
705/16
10,826,900 B1 * 11/2020 Poder .................... H04L 63/105
(Continued)

FOREIGN PATENT DOCUMENTS

DE   102010032033 A1   1/2012
EP       2464204 A1   6/2012
(Continued)

OTHER PUBLICATIONS

French Search Report dated Apr. 6, 2022 for corresponding French Patent Application No. FR 2108666, 2 pages.
(Continued)

*Primary Examiner* — Farley Abad
(74) *Attorney, Agent, or Firm* — Troutman Pepper Locke LLP

(57) ABSTRACT

A method for configuring electrical devices in an electrical panel includes acquiring machine-readable configuration data including a list of electrical devices to be installed; displaying a visual identifier on an electronic display screen associated with each device; acquiring an image showing the devices in the panel with the visual identifiers displayed by each of the devices; a processor comparing identification information of each device on the list with the identification information from the visual identifiers of the acquired image; and for each device on the list whose identification information corresponds to the information of one of the visual identifiers of the acquired image, sending a setting parameter to be applied to the device.

10 Claims, 3 Drawing Sheets

(51) Int. Cl.
  *G05B 19/048* (2006.01)
  *H02B 1/30* (2006.01)
  *H02B 1/48* (2006.01)

(56) References Cited

U.S. PATENT DOCUMENTS

| | | | |
|---|---|---|---|
| 10,998,699 B2 * | 5/2021 | Steinberger | G05B 19/108 |
| 2011/0072423 A1 * | 3/2011 | Fukata | G06F 9/44552 |
| | | | 717/172 |
| 2012/0066315 A1 * | 3/2012 | Tuman | H04L 67/306 |
| | | | 726/17 |
| 2016/0110207 A1 * | 4/2016 | Herzi | G06F 9/44505 |
| | | | 713/1 |
| 2022/0308726 A1 * | 9/2022 | Gur | G06F 3/04162 |

FOREIGN PATENT DOCUMENTS

| | | | |
|---|---|---|---|
| WO | 2017191059 A1 | 11/2017 | |
| WO | 2020025399 A1 | 2/2020 | |

OTHER PUBLICATIONS

International Search Report dated Nov. 14, 2022 for corresponding International Patent Application No. PCT/EP2022/072507, 2 pages.

\* cited by examiner

METHODS AND SYSTEMS FOR AUTOMATICALLY CONFIGURING ELECTRICAL DEVICES IN AN ELECTRICAL PANEL

FIELD OF THE INVENTION

The invention relates to methods and systems for automatically configuring electrical devices in an electrical panel.

BACKGROUND OF THE INVENTION

In the field of electricity distribution, there are panels with one or more electrical cabinets, each with removable drawers in which one or more electrical devices can be installed.

Electrical devices, which may be electrical protection devices, or switching devices, or measuring devices, or variable speed drives, or any equivalent device, may communicate with a control device, such as an industrial computer, which supervises the operation of the electrical panel.

Each cabinet incorporates network equipment, such as a router, which allows the devices in each drawer to communicate with the control device.

A problem arises when a user wants to configure all the devices, for example when commissioning the electrical panel following the installation of the electrical panel or following a maintenance operation.

Typically, to do this, a user must manually configure each of the electrical devices, in order to identify the device, to confirm that the device is installed in the correct location, and then to set the device with operating parameters. These operations can be very time-consuming and laborious when the user has to work on installations with a large number of devices, for example several dozen or even several hundred devices.

There is also, at least in part because the configuration is done manually, a risk of error that can lead to a device being misidentified or incorrectly adjusted, which can have adverse consequences on the proper functioning of the electrical panel, or even cause a safety problem.

The invention is also applicable in other technical fields, for example for electrical panels housing communication equipment in a data centre.

These drawbacks are specifically addressed by the invention, which proposes methods and systems for automatically configuring electrical devices in an electrical panel.

SUMMARY OF THE INVENTION

To this end, one aspect of the invention relates to a method of configuring electrical devices in an electrical panel, this method comprising the steps of:
  acquiring machine-readable configuration data comprising a list of electrical devices to be installed, the list comprising, for each electrical device to be installed, identification data of the electrical device, and at least one setting parameter to be applied;
  in each electrical device present in the electrical panel displaying a visual identifier on an electronic display screen associated with the electrical device, the displayed visual identifier comprising information identifying said device;
  using a user terminal, comprising an optical sensor, acquiring an image showing the electrical devices present in the electrical panel, said acquired image comprising the visual identifiers displayed by each of said electrical devices;
  using a processor:
    automatically comparing the identification information of each electrical device in said list with the identification information of the visual identifiers of the acquired image;
    for each electrical device on the list whose identification information matches the identification information of one of the visual identifiers of the acquired image, sending said at least one setting parameter to be applied to said electrical device;
    for each electrical device on the list whose identification information does not match the identification information of one of the visual identifiers in the acquired image, identifying an anomaly condition.

According to advantageous but not mandatory aspects, such a method may incorporate one or more of the following features, taken in any combination that is technically feasible:
  a manual verification step is implemented when an anomaly condition is identified for at least one electrical device.
  the manual verification step comprises, for said electrical device:
    sending a request to a user to manually operate an interface element of a user interface associated with said electrical device;
    acquiring information from a device of the panel indicating that a user has interacted with said interface element,
    if the device that sent said information matches the device for which the fault condition was raised, reporting the fault condition and considering the said electrical device as having been successfully identified.
  after identifying a fault condition for an electrical device, the method displays a fault message on a user interface associated with said electrical device.
  the fault message is displayed by activating an indicator light on the user interface associated with that electrical device.
  the visual identifier is an optically readable two-dimensional code, such as a data matrix code, or a QR code, or a bar code, or any equivalent code.
  the user terminal is a mobile communication device, such as a mobile phone, or a digital tablet, or a portable personal assistant, or a portable computer, or any electronic device—for each electrical device on the list whose identification information corresponds to the identification information of one of the visual identifiers of the acquired image, said at least one setting parameter sent is applied by an electronic controller associated with said electrical device.
  each electrical device is associated with an indicator light, said indicator light remaining on until the electrical device has been successfully configured.

According to another aspect, the invention relates to a system for configuring electrical devices in an electrical panel, the system comprising an electrical panel, a user terminal, and electrical devices installed in the electrical panel, the system being configured to perform the steps consisting of:
  acquiring machine-readable configuration data comprising a list of electrical devices to be installed, the list comprising, for each electrical device to be installed, identification data of the electrical device, and at least one setting parameter to be applied;

each electrical device present in the electrical panel displaying a visual identifier on an electronic display screen associated with the electrical device, the displayed visual identifier comprising information identifying said device;

using a user terminal, comprising an optical sensor, acquiring an image showing the electrical devices present in the electrical panel, said acquired image comprising the visual identifiers displayed by each of said electrical devices;

using a processor automatically comparing the identification information of each electrical device in said list with the identification information of the visual identifiers of the acquired image;

for each electrical device on the list whose identification information matches the identification information of one of the visual identifiers of the acquired image, sending said at least one setting parameter to be applied to said electrical device;

for each electrical device on the list whose identification information does not match the identification information of one of the visual identifiers in the acquired image, identifying an anomaly condition.

BRIEF DESCRIPTION OF THE DRAWINGS

The invention will be better understood and advantages beyond these will emerge more clearly in light of the following description of an embodiment of a method for automatically configuring electrical devices in an electrical panel, given solely by way of example and made with reference to the accompanying drawings, in which.

DETAILED DESCRIPTION OF EMBODIMENTS

Figure 1:
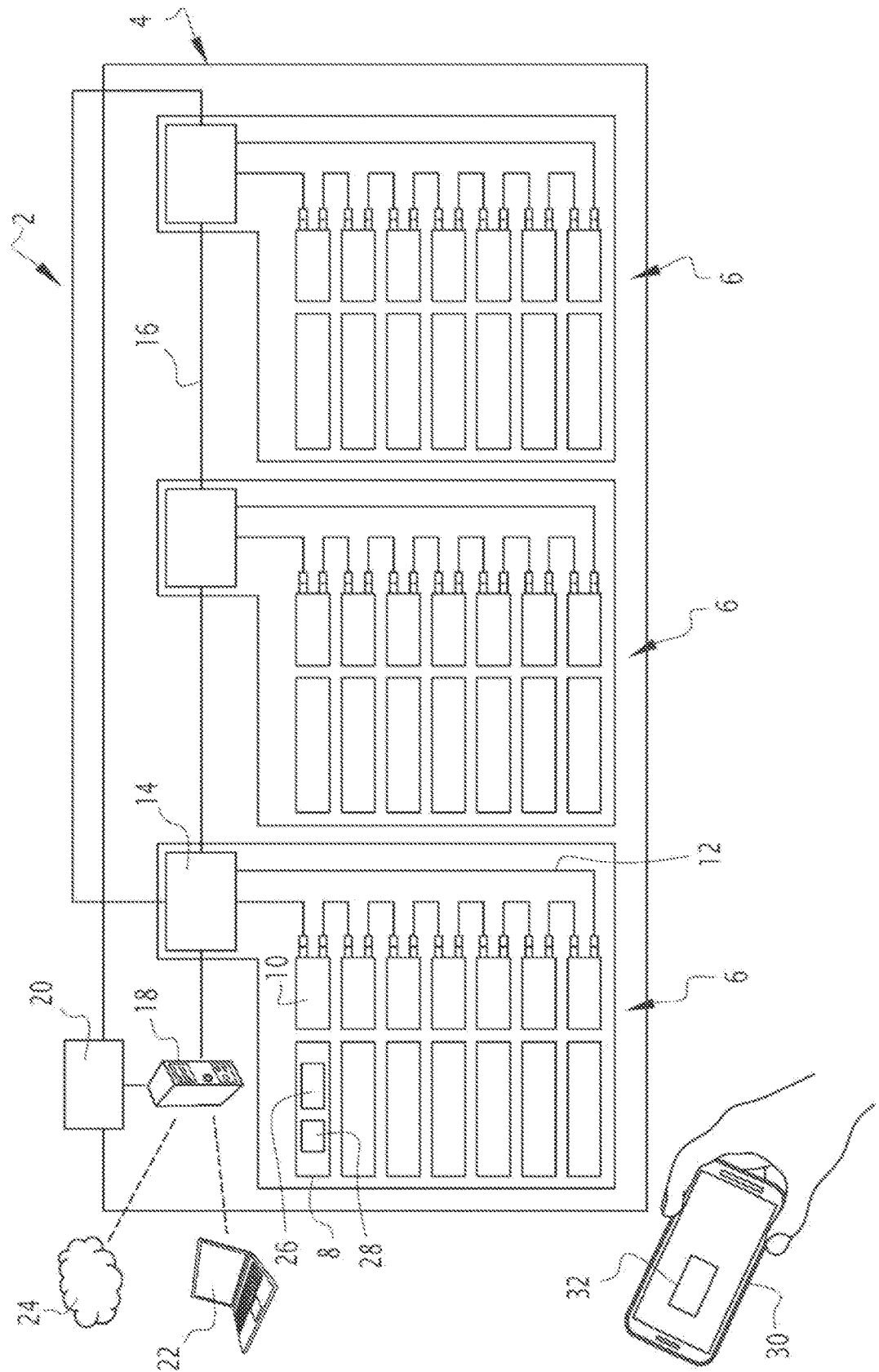
FIG. 1 schematically shows an example of an electrical panel with electrical devices and a system for registering the electrical devices with a control device controlling the electrical panel.

FIG. 1 shows a system 2 comprising an electrical panel 4.

The electrical panel 4 has several electrical cabinets 6.

Each electrical cabinet 6 has removable drawers 8 each configured to accommodate one or more electrical devices.

For example, electrical devices may be electrical protection devices, or switching devices, or measuring devices, or motor management devices (also known as drivers), or variable speed drives, or any equivalent device.

In some embodiments, the electrical panel 4 is used in an electrical distribution system.

In the example shown, the control cabinets 6 have similar dimensions and are arranged side by side within the electrical panel 4.

For example, the electrical panel 4 has a frame in which several compartments are defined, each of which forms one of the electrical cabinets 6.

In the illustrated embodiment, the removable drawers 8 (also known as pull-out drawers) are arranged in a column, for example vertically one above the other, in each electrical cabinet 6.

Thus, the removable drawers 8 are distributed between a plurality of electrical cabinets 6 to form a plurality of columns within the electrical panel 4.

In practice, each electrical cabinet 6 may comprise several tens of removable drawers 8, for example thirty removable drawers, the number of drawers shown in FIG. 1 being reduced for the sake of clarity and not being limiting.

The removable drawers 8 are configured to be reversibly inserted into and/or removed from corresponding housings in the electrical cabinets 6.

This allows devices to be connected and disconnected quickly, sometimes while the electrical panel 4 is running.

Each electrical cabinet 6 further comprises connectors 10 each capable of engaging a removable drawer 8 when the removable drawer 8 is inserted into a housing in the electrical cabinet 6.

For example, the connectors 10 are data exchange connectors. The connectors 10 are fixedly mounted in the electrical cabinet 6, preferably laterally in the housings of the electrical cabinet 6, and are configured to be connected to corresponding connectors mounted on the drawers 8, preferably laterally mounted, on at least one lateral side of said drawer 8.

Electrical power connectors, also known as power clamps, can be arranged at the bottom of the housings to provide a connection to the bottoms of the drawers 8.

This ensures an electrical connection between, on the one hand, the electrical device contained in each removable drawer 8 and, on the other hand, one or more items of equipment contained in the electrical panel, such as a power supply or a communications network.

Each electrical cabinet 6 further includes communication links 12 and network equipment 14, such as a router.

The communication links 12 connect the connectors 10 (and the electrical devices contained in the corresponding electrical drawers) to the network equipment 14.

For example, the communication links 12 comprise cables, such as Ethernet cables.

In this example, only one electrical cabinet 6 has been described in detail for the sake of simplicity, but it is understood that preferably the electrical cabinets 6 of the electrical panel 4 are similar or even identical in design and have similar or identical components.

The electrical panel 4 further comprises a computer network 16 that connects the network equipment 14 in each of the electrical cabinets 6.

For example, the computer network 16 is a wired network, such as an Ethernet-type network.

The electrical panel 4 further comprises a control device 18.

For example, the control device 18 is an industrial computer (or industrial PC, for "personal computer").

Alternatively, the control device 18 may be a programmable logic controller, or any equivalent device.

The monitoring device 18 is connected to the computer network 16, for example via one of the network devices 14.

The control device 18 comprises a processor, such as a microprocessor, and a computer memory or any appropriate computer-readable data storage medium.

The memory or storage medium contains executable instructions and/or software code intended to, inter alia, supervise the operation of the electrical cabinet 4 and implement a method of registering electrical devices in the electrical cabinet 4 when these instructions are executed by the processor.

Alternatively, the control device 18 may comprise a digital signal processor (DSP), or a reprogrammable logic device (FPGA), or a specialized integrated circuit (ASIC), or any equivalent.

The electrical panel 4 further comprises a command console 20.

The command console 20 comprises human-machine interface elements allowing a user to interact with the electrical panel 4, in particular to communicate instructions or to view a display of one or more internal states of the electrical panel 4.

For example, the command console 20 has indicator lights, such as LEDs, and/or a display screen and/or buttons and/or a keypad and/or a buzzer.

Here the command console 20 is connected to the control device 18.

The control device 18 can also be connected to a workstation 22 located outside the electrical panel 4.

The control device 18 further comprises communication means enabling it to connect to a remote computer network 24, such as the Internet, for example to access a software service hosted by one or more remote computer servers, such as a cloud computing service.

As illustrated in FIG. 1 with reference to a single drawer 8, for illustrative purposes, each drawer 8 has an electronic controller 26 and a command interface 28.

For example, the electronic controller 26 comprises a processor and computer memory.

In this description, the use of the term "processor" does not preclude that, alternatively, at least some of the functions performed by a processor may be performed by other electronic components, such as a digital signal processor (DSP), or a reprogrammable logic device (FPGA), or a specialised integrated circuit (ASIC), or any equivalent element, or any combination thereof.

In particular, the memory is capable of storing identification information specific to the electrical device, as well as operating parameters (settings) of the electrical device.

The identification information may comprise, for example, but is not limited to, a unique identifier such as a serial number, and/or a removable drawer type identifier and/or a network address, such as a hardware address (MAC address) or an IP address (in particular an IPV6 address).

For example, in the case where the electrical device is a motor starter, the identification information may further comprise:

information on the electrical load driven by the electrical device (e.g. the electrical power rating and/or the name of the load)

characteristics on the function of the motor starter (for example, functions known as direct on line, soft starter, reverser, drive, etc.).

In many embodiments, the electronic controller 26 is configured to apply the setting parameters provided by a user to regulate the operation of the electrical device with which it is associated (in the removable drawer 8).

For example, if the electrical device is a motor starter, the electronic controller 26 can advantageously serve as a communication gateway between the connector 10 and the electrical device for measurements and for controlling the motor driven by the motor starter.

In another example, where the electrical device is a switching device, the electronic controller 26 can advantageously manage voltage and current measurements, can monitor the state (open or closed) of the electrical device, can report warning information about a triggering of the electrical device, and so on.

The command interface 28 comprises human-machine interface elements enabling a user to interact with the removable drawer 8, for example to communicate instructions or to view a display of one or more internal states of one or more electrical devices contained in the removable drawer 8.

In practice, the command interface 28 may be limited to a role of displaying information (such as displaying one or more internal states of one or more electrical devices) in cases where the control cabinet 6 already comprises human-machine interface elements.

Preferably, the command interface 28 comprises at least one electronic display screen and one indicator light.

The electronic display screen may be a liquid crystal display, or an organic diode display (OLED), or an electrophoretic display (which has a bistable state and thus retains the displayed information in the event of a power failure), or any suitable display technology. The indicator light may be a light-emitting diode (LED), preferably one that can emit light of several different colours.

In particular, the command interface 28 is configured to display a visual identifier comprising identification information specific to the electrical device, for example to display, in an encoded form, at least part of the identification information stored in the memory of the electronic controller 26.

For example, the visual identifier is an optically readable two-dimensional code, such as a data matrix code, or a QR code, or a bar code, or any equivalent code.

Alternatively, the visual identifier could be plain text, for example a string of numeric or alphanumeric characters. However, the choice of an optically readable two-dimensional code allows for better readability and error correction. Preferably, the visual identifier can include an error correction code.

The system 2 further comprises a terminal 30, such as a mobile communication terminal, for use by a user in a method for automatically configuring the electrical devices in the electrical panel 4 that are registered with the control device 18.

In some embodiments, the terminal 30 is a mobile communication device, such as a mobile phone, or a digital tablet, or a portable personal assistant, or a laptop computer, or any equivalent electronic device.

For example, the terminal 30 comprises a processor 32, a computer memory, and at least one optical sensor, such as an optical camera.

The optical sensor is able to acquire digital images.

For example, the terminal 30 comprises processing means for processing and storing the digital images acquired by the optical sensor.

The terminal 30 may further comprise an electronic display screen.

The terminal 30 further comprises a communication interface for establishing a communication link, in particular with the control device 18, in order to exchange data with the control device 18.

For example, the communication interface of the terminal 30 may comprise a wireless communication interface, including a transceiver and a radio frequency antenna, compatible with a wireless communications network, such as a WiFi network, and/or with a mobile telecommunications network, such as a GSM, or LTE, or equivalent network.

In particular, the invention enables the automatic configuration of the electrical devices in the electrical panel 4 that are registered with the control device 18, by automatically configuring them from pre-prepared configuration data.

The pre-prepared configuration data may contain, for each device, at least one setting parameter to be applied to that device.

For example, configuration data is prepared in the form of machine-readable configuration data, for example in a structured file of the type XML ("Extensible Markup Language"), or JSON ("JavaScript Object Notation"), or any equivalent electronic data storage format.

Alternatively, it may be a database.

The configuration method aims in particular to check that the electrical devices to be installed are physically installed in the electrical panel 4, and that they are installed in the location chosen in advance. The method also aims to configure the electrical devices with the pre-selected setting parameters.

This configuration method can advantageously be carried out after the electrical devices have been physically installed in the electrical panel 4, when the electrical panel 4 is put into service, or following a maintenance operation that has led to a modification of the electrical panel 4, for example.

Generally, in many embodiments, the configuration method comprises the steps of:
- acquiring machine-readable configuration data comprising a list of electrical devices to be installed, the list comprising, for each electrical device to be installed, identification data of the electrical device, and at least one setting parameter to be applied;
- each electrical device present in the electrical panel 4 displaying a visual identifier on an electronic display screen associated with the electrical device (here associated with the user interface of the removable drawer 8 in which the electrical device is received), the displayed visual identifier comprising information identifying said device;
- using a user terminal 30, comprising an optical sensor, acquiring an image showing the electrical devices present in the electrical panel, said acquired image comprising the visual identifiers displayed by each of said electrical devices;
- Using a processor (e.g. the processor of the control device 18);
- automatically comparing the identification information of each electrical device in said list with the identification information of the visual identifiers of the acquired image,
- for each electrical device on the list whose identification information matches the identification information of one of the visual identifiers of the acquired image, sending said at least one setting parameter to be applied to said electrical device (the electronic controller 26 associated with the device),
- for each electrical device on the list whose identification information does not match the identification information of one of the visual identifiers in the acquired image, identifying an anomaly condition.

It should be noted that, alternatively, the steps described here could be carried out in a different order. Some steps may be omitted. The example described does not preclude, in other embodiments, other steps being implemented in conjunction and/or sequentially with the steps described.

Thanks to the invention, it is possible to quickly configure a large number of electrical devices in the electrical panel 4. The identification and detection of the devices is carried out automatically by optical recognition, from the acquired image taken by the user by means of the user terminal 30, thanks to the visual identifiers displayed by the electrical devices and present in the acquired image.

This identification is simpler and more reliable to implement than manual identification, as the latter carries a high risk of misidentifying a device.

Once the devices have been identified, the predefined settings are automatically sent to the devices to adjust them in accordance with the plans set in advance by a user. This configuration step can be done automatically and is therefore faster and less prone to errors than if it had to be done manually, device by device, by a user.

An example of the implementation of the configuration method is now described with reference to the diagrams in FIGS. 2 and 3.

The method will be described mainly by means of the flowchart in FIG. 3, although the diagram in FIG. 2 may be used to clarify certain operating details in some embodiments.

Initially, a plurality of electrical devices awaiting configuration are present in the electrical panel 4.

The machine-readable configuration data with the list of electrical devices to be installed is provided by a user. For example, this list can be sent to the control device 18.

For example, at this stage, the electrical devices are received in removable drawers 8 which are in the connected (inserted) position in the corresponding housings of the electrical cabinets 6.

In the following, for the sake of simplicity, it can be assumed that each electrical device is received in a separate drawer.

However, in practice, more than one electrical device could be received in a single removable drawer 8 (and thus more than one electrical device could be associated with the same electronic controller 26 and user interface 28).

The method is started in a step S200.

Next, in response, in a step S202, the electrical devices enter a configuration mode. Each electrical device then displays a visual identifier on an electronic display screen of the corresponding user interface 28, the displayed visual identifier comprising identification information of said device.

Advantageously, for each electrical device to be configured, an indicator light is activated. This indicator light remains on until the electrical device has been successfully configured.

This indicator light may be a light-emitting diode of the user interface 28 that illuminates by emitting light with a specific colour (e.g. white).

In a step S204, the user acquires, with the terminal 30, an image showing the electrical devices present in the electrical panel, said acquired image comprising the visual identifiers of each of said electrical devices.

Image acquisition may involve acquiring a single image, such as a digital photograph, or a plurality of images, for example a video stream.

It is understood here that the identification information of the visual identifiers of the acquired image(s) is automatically extracted from the visual identifiers displayed on the acquired image(s).

This extraction can be done by means of an image analysis program, for example by software means such as those used in image recognition systems for augmented reality.

This automatic extraction may be carried out by the control device 18, in whole or at least in part, or even by the terminal 30, possibly with the assistance of an ancillary software service, which ancillary software service may be hosted on a remote computer server, for example.

Subsequently, the identification information of each electrical device in said list is automatically compared with the identification information of the visual identifiers of the acquired image(s), for example in a sequence of steps repeated in a loop.

In a step S206, an electrical device from the list is selected.

In a step S208, it is investigated whether the identification information of the selected electrical device on the list ("target device") matches identification information extracted from the acquired image.

If no match is found, then the method identifies an anomaly condition, for example in a step S210.

For example, an alert is sent and/or displayed to a user, including displaying a fault message on a user interface associated with said electrical device.

The fault message may be displayed by activating an indicator light on the user interface associated with that electrical device. For example, the indicator light may be red.

If instead such a match is found, then in a step S212 the matching device is said to be identified, and the configuration parameters are sent to this device by the control unit 18, for example by means of the local computer network and the routing equipment 14.

In response to step S212, for each electrical device on the list whose identification information matches the identification information of one of the visual identifiers of the acquired image, said at least one sent setting parameter is applied by an electronic controller associated with said electrical device.

In a step S214, the method checks whether the one or more parameters sent to this electrical device have been applied.

If the one or more parameters sent to that electrical device were not received or could not be applied, then the method identifies an anomaly condition, for example in a step S216 that is the same as or similar to step S210.

If, on the other hand, the parameter(s) sent to this electrical device have been applied, then, in a step S218, the corresponding device is said to be configured.

For example, an indicator light associated with the electrical device changes its status. In particular, the indicator light can change colour, for example to green.

If applicable, the indicator light previously activated as a result of step S202 is deactivated.

In a step S220, the method checks whether at least one electrical device to be configured remains in the acquired list. If necessary, as illustrated by step S202, the method repeats steps S206 and following as described above.

Step S220 is repeated until there are no more electrical devices left to process on the list.

The method is then terminated in a step S224.

For example, a report can be generated and/or sent to the user, informing them of any devices that could not be configured.

Alternatively, the comparison could be performed by browsing the list of electrical devices detected in the acquired image from the visual identifiers displayed, and comparing this list to the list of electrical devices to be configured acquired in the configuration data.

Figure 2:
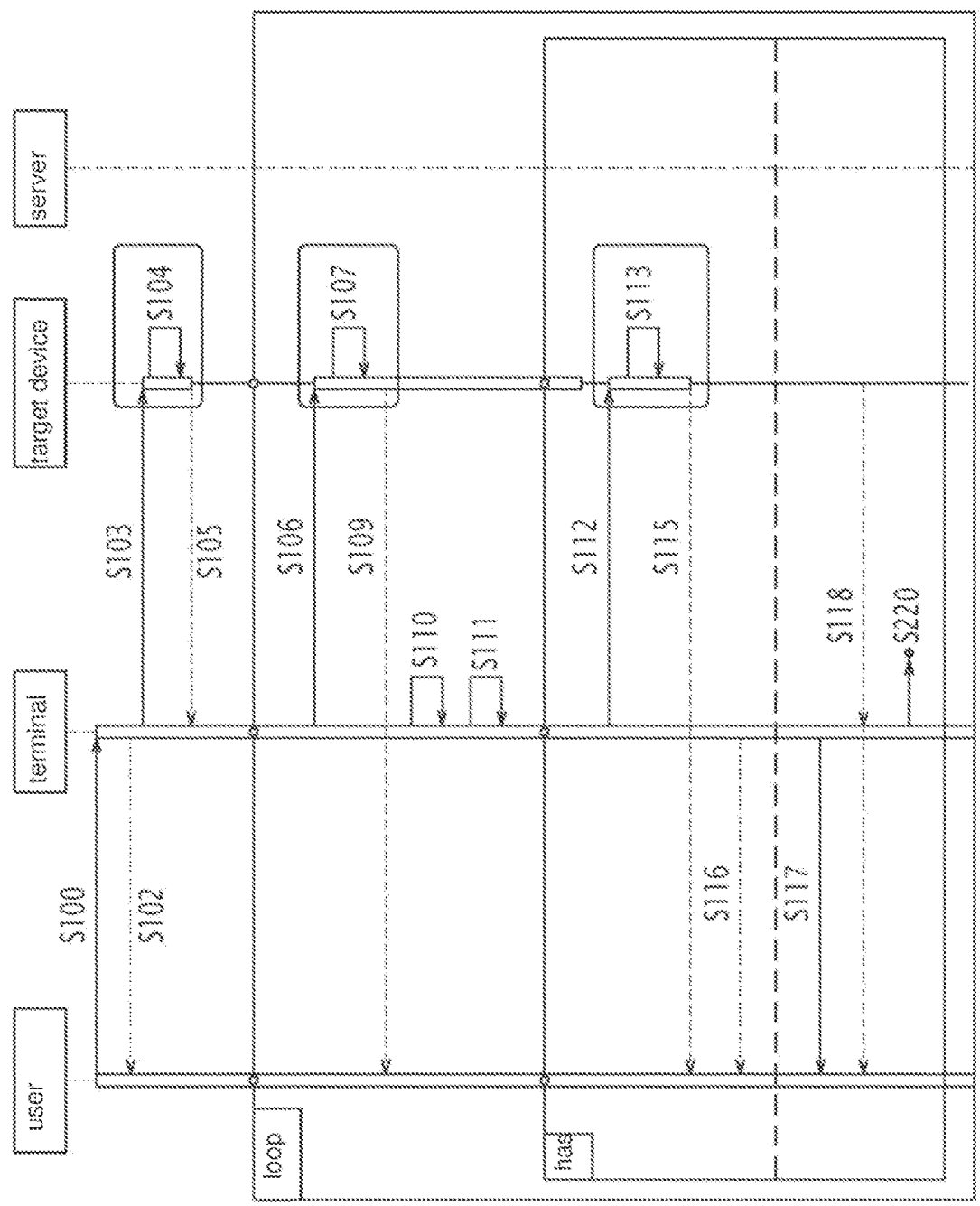
FIG. 2 shows a diagram illustrating the operating steps of a method for registering electrical devices of the electrical panel of FIG. 1.
Figure 3:
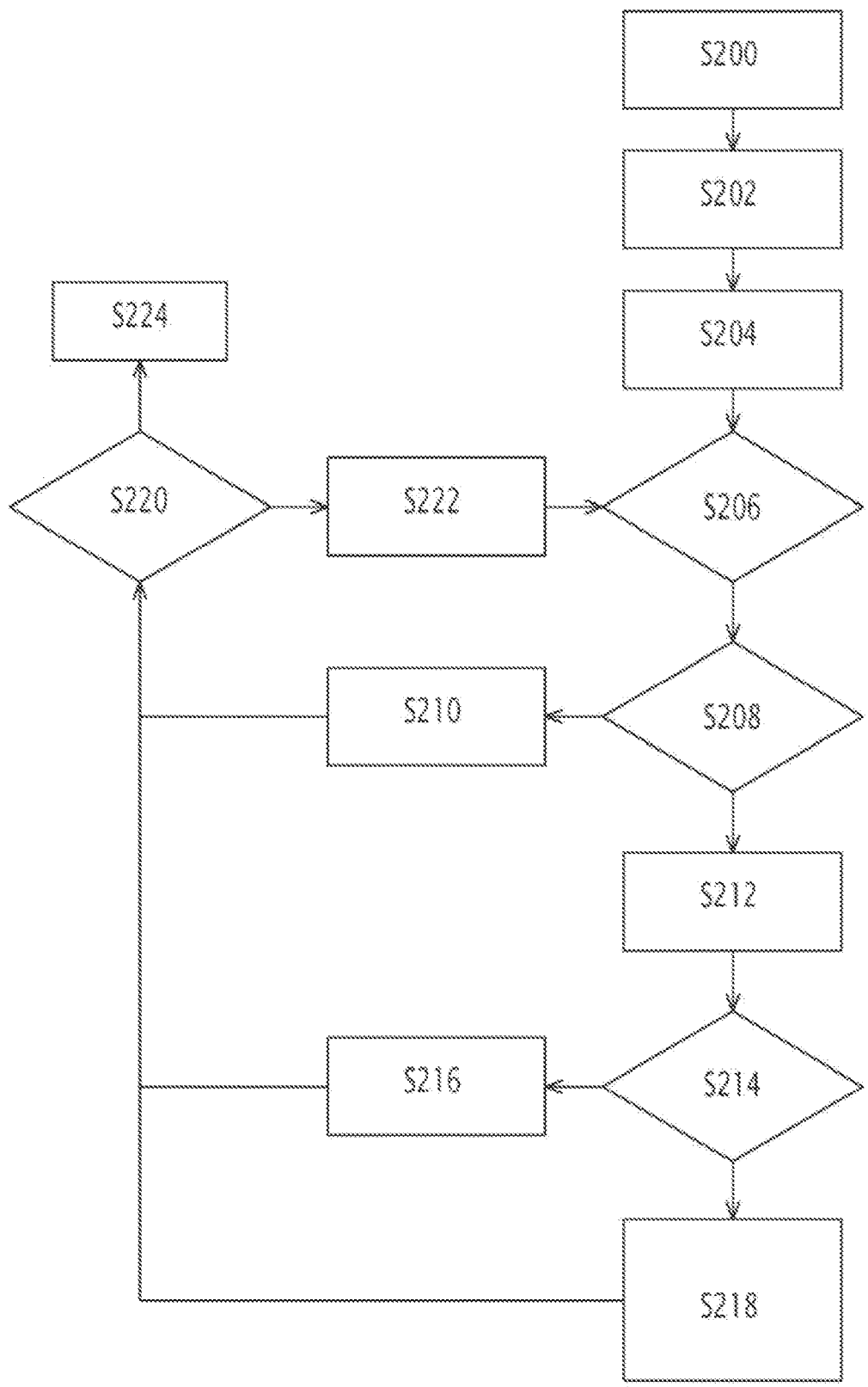
FIG. 3 shows a diagram illustrating the operating steps of a method for registering electrical devices of the electrical panel of FIG. 1.

In the illustrative example shown in FIG. 2, the method starts in step S100, for example, at the request of a user, who then scans the electrical panel 4 with the terminal in order to acquire at least one image of the electrical panel.

The list of electrical devices identified in the acquired image can be displayed to the user in a step S102.

The method compares the identification information on the list with that acquired in steps S103 and S104 and returns the result in a step S105.

Then, for each detected electrical device, the method extracts the information (steps S106, S107 and S109) and then determines the expected position of the device (step S110) and searches for a matching device in the acquired list (step S111).

For each identified device, the parameters are sent in a step S112, are applied in a step S113, and a confirmation is sent in a step S115 from the corresponding electronic controller 26 to the control device 18. Then a confirmation is sent from the control device 18 to the terminal 30 in a step S116.

In case of failure to identify an electrical device, an error message is sent from the control device 18 to the terminal 30 in a step S117.

In case of failure to configure an identified electrical device, an error message is sent to the terminal 30 in a step S118.

The method then proceeds to the next identified device in a step S120.

Numerous other embodiments are possible.

For example, optionally but advantageously, a manual verification step is implemented when an anomaly condition is identified and persists for at least one electrical device.

This manual verification step may be performed at or after step S224 and may be repeated for each electrical device that could not be configured.

The manual verification step comprises, for said electrical device:

sending a request to a user to manually operate an interface element of a user interface associated with said electrical device;

acquiring information from a device of the panel indicating that a user has interacted with said interface element, if the device that sent said information matches the device for which the fault condition was raised, reporting the fault condition and considering the said electrical device as having been successfully identified.

For example, the user may be asked to press a button on the user interface.

The target device may then be identified by a specific indicator, such as an indicator light assuming a specific state, such as flashing and/or changing colour, or a specific colour, in order to guide the user to that electrical device and to distinguish that device from the plurality of other electrical devices in the electrical panel 4.

The above-mentioned embodiments and variants envisaged above can be combined to create new embodiments.

The invention claimed is:

1. A method for configuring electrical devices in an electrical panel, the method comprising:

acquiring machine-readable configuration data comprising a list of electrical devices to be installed, the list comprising, for each electrical device to be installed, identification data of the electrical device, and at least one setting parameter to be applied;

each electrical device present in the electrical panel displaying a visual identifier on an electronic display screen associated with the electrical device, the displayed visual identifier comprising identification information identifying said electrical device;

using a user terminal comprising an optical sensor, acquiring an image showing the electrical devices present in the electrical panel, said acquired image comprising the visual identifiers displayed by each of said electrical devices;

using a processor:

automatically comparing the identification data of each electrical device in said list with the identification information of the visual identifiers of the acquired image;

for each electrical device on the list whose identification data matches the identification information of one of the visual identifiers of the acquired image, sending said at least one setting parameter to be applied to said electrical device;

for each electrical device on the list whose identification data does not match the identification information of one of the visual identifiers in the acquired image, identifying an anomaly condition.

2. The method according to claim 1, wherein a manual verification is implemented when an anomaly condition is identified for at least one electrical device.

3. The method according to 2, wherein the manual verification comprises, for said electrical device:

sending a request to a user to manually operate an interface element of a user interface associated with said electrical device;

acquiring information from a device of the panel indicating that a user has interacted with said interface element, if the device that sent said information matches the electrical device for which the anomaly condition was raised, reporting the anomaly condition and considering the said electrical device as having been successfully identified.

4. The method according to claim 1, wherein after identifying an anomaly condition for an electrical device, the method displays an anomaly message on a user interface associated with said electrical device.

5. The method according to claim 4, wherein the anomaly message is displayed by activating an indicator light on the user interface associated with said electrical device.

6. The method according to claim 1, wherein the visual identifier is an optically readable two-dimensional code.

7. The method according to claim 1, wherein the user terminal is a mobile communication device.

8. The method according to claim 1, wherein, for each electrical device on the list whose identification data matches the identification information of one of the visual identifiers of the acquired image, said at least one sent setting parameter is applied by an electronic controller associated with said electrical device.

9. The method according to claim 1, wherein each electrical device is associated with an indicator light, said indicator light remaining on until the electrical device has been successfully configured.

10. A system for configuring electrical devices in an electrical panel, the system comprising an electrical panel, a user terminal and electrical devices installed in the electrical panel, the system being configured to perform:

acquiring machine-readable configuration data comprising a list of electrical devices to be installed, the list comprising, for each electrical device to be installed, identification data of the electrical device, and at least one setting parameter to be applied;

each electrical device present in the electrical panel displaying a visual identifier on an electronic display screen associated with the electrical device, the displayed visual identifier comprising identification information identifying said electrical device;

by a user terminal comprising an optical sensor, acquiring an image showing the electrical devices present in the electrical panel, said acquired image comprising the visual identifiers displayed by each of said electrical devices;

by a processor:

automatically comparing the identification data of each electrical device in said list with the identification information of the visual identifiers of the acquired image;

for each electrical device on the list whose identification data matches the identification information of one of the visual identifiers of the acquired image, sending said at least one setting parameter to be applied to said electrical device;

for each electrical device on the list whose identification data does not match the identification information of one of the visual identifiers in the acquired image, identifying an anomaly condition.

* * * * *